Dec. 22, 1959 B. HOWARD 2,918,527

SELECTOR FOR TELEGRAPH PRINTER

Filed April 10, 1957 4 Sheets-Sheet 1

INVENTOR
BERNARD HOWARD
BY James and Franklin
ATTORNEYS

SELECTOR FOR TELEGRAPH PRINTER

Filed April 10, 1957 4 Sheets-Sheet 2

INVENTOR.
BERNARD HOWARD
BY James and Franklin
ATTORNEYS

SELECTOR FOR TELEGRAPH PRINTER

Filed April 10, 1957

4 Sheets-Sheet 3

INVENTOR.
BERNARD HOWARD

BY James and Franklin

ATTORNEYS

INVENTOR.
BERNARD HOWARD
BY James and Franklin
ATTORNEYS

United States Patent Office 2,918,527

Patented Dec. 22, 1959

2,918,527

SELECTOR FOR TELEGRAPH PRINTER

Bernard Howard, Ramsey, N.J., assignor to Teleprinter Corporation, Hackensack, N.J., a corporation of New Jersey

Application April 10, 1957, Serial No. 651,931

22 Claims. (Cl. 178—34)

This invention relates to a telegraphic printer, and more particularly to a selector mechanism therefor.

The general object of the present invention is to improve the telegraph printer disclosed in my Patent No. 2,769,029, granted October 30, 1956. In that patent, I disclose a telegraph printer utilizing type on a cylinder, arranged for both axial and rotative movement by means of two cables each acted on by pulleys which appropriately shorten or lengthen the cables. The pulleys are mounted on levers which are moved by cams on a main cam shaft. The shaft turns continuously, but the cams are turned through individual half revolution clutches, thus providing either an "in" position or an "out" position for the corresponding lever and pulley. The clutches are controlled by stops which are themselves controlled by magnets. In my aforesaid patent, the stops are urged by resilient means to release position, but are held in stop position by the direct pull of electromagnets.

An improvement on this arrangement is disclosed in my copending application Serial No. 652,179, filed April 11, 1957 in which the electrical power needed is greatly reduced, and the speed of operation is increased, by controlling the stops of each clutch by means of a light weight latch which has only a slight movement, while the magnets with their associated circuitry control the latch, and thus indirectly instead of directly control the clutch stops.

The primary object of the present invention is to further improve the latch mechanism of said copending application Serial No. 652,179. More specific objects are to employ a greatly reduced number of latches; to provide a latch which is balanced; to provide a latch which may be operated by relatively large magnets having a large number of windings, and which therefore exert a strong magnetic pull while requiring only small current; to provide a latch and magnet arrangement in which the air gap between the latch and magnet is minimized and the travel of the latch is minimized; to provide a latch and magnet arrangement in which the magnets may be U-shaped magnets for maximum efficiency; to provide a latch arrangement making possible the use of hardened or tool-steel stop surfaces for long wear; to provide a latch arrangement which requires no sensitive adjustments; and to provide a latch arrangement which facilitates servicing because the entire latch mechanism may be bodily removed from the clutch stop lever assembly.

To accomplish the foregoing objects, and other objects which will hereinafter appear, my invention resides in the selector elements and their relation one to another as are more particularly described in the following specification. The specification is accompanied by drawings in which.

Figure 1:
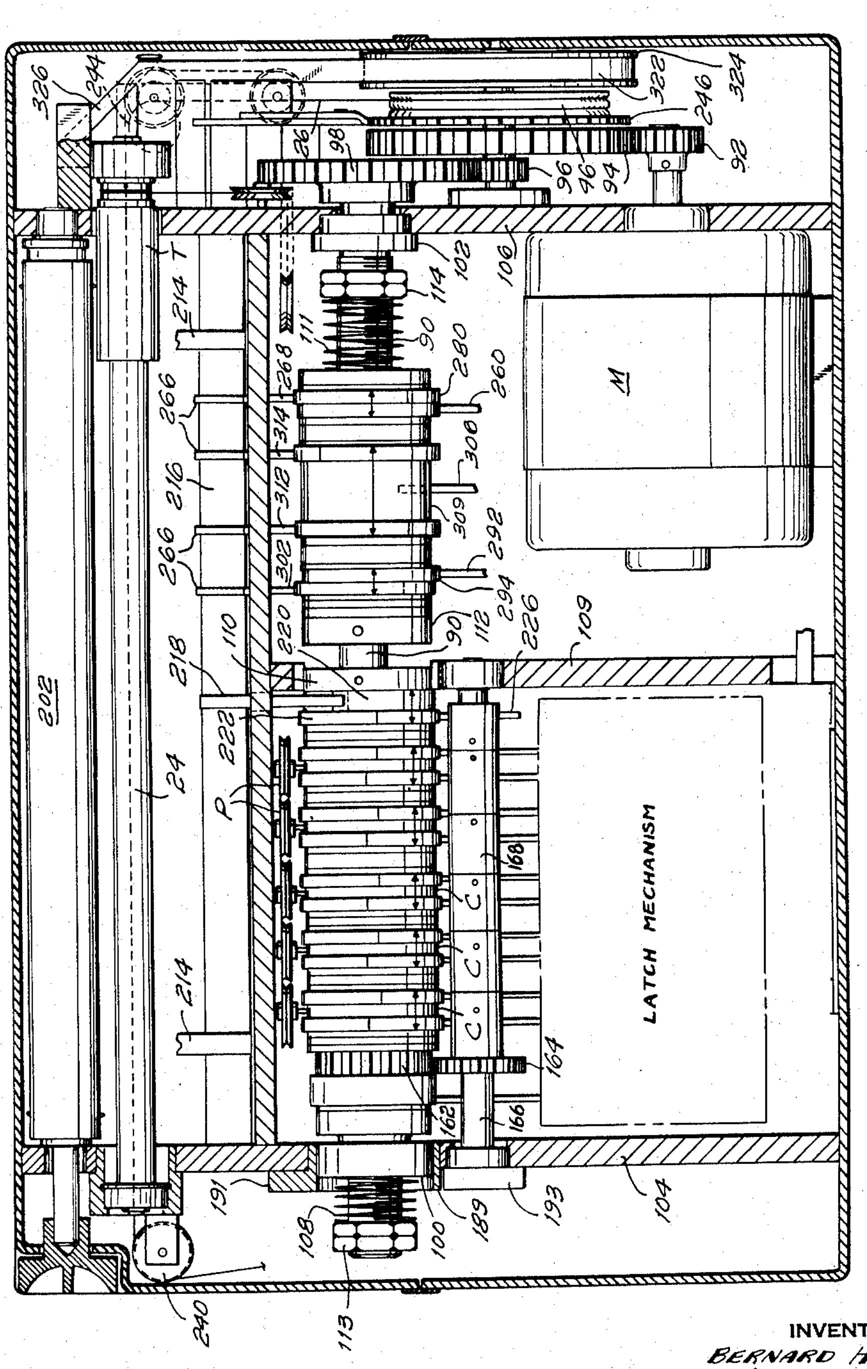
Fig. 1 is a horizontal section which corresponds substantially to Fig. 1 of my Patent No. 2,769,029, and shows one example of telegraph printer to which the present improvements are applied.

Referring to the drawing, and more particularly to Fig. 1, the telegraph printer there shown corresponds generally to that disclosed and described in detail in my Patent No. 2,769,029. The type cylinder is shown at T, and is movable axially by means of a cable, shown in dotted lines within hollow shaft 24. It is also movable rotatably because it is slidably keyed on said shaft 24, which shaft is turned by means of another cable shown at the right end of the shaft. The paper passes around a paper roll 202. The selection of type is determined by lengthening or shortening of the two cables, which in turn depends on movement of a series of pulleys P between "in" and "out" positions. The pulleys are disposed at the ends of cam follower levers, which are moved by a series of cams C carried on a main cam shaft 90. This is continuously driven by a synchronous motor M through a gear train including pinion 92 meshing with gear 94 which turns pinion 96 meshing with gear 98 mounted on cam shaft 90. The cams are normally stationary, but at intervals are permitted movement by release of half revolution clutches immediately adjacent their respective cams on shaft 90. Alternate pulley levers which are in front of the cams are omitted to help simplify the drawing.

Compared to my Patent 2,769,029, the printer structure has been turned bodily and is used in horizontal instead of vertical position. This change is shown and explained in my copending application Serial No. 596,294, filed July 6, 1956, and entitled "Telegraph Printing Apparatus." In brief, the horizontal arrangement proves more convenient and compact when the printer (receiver) is associated with a transmitter (keyboard). This comment is made to explain the horizontality of Fig. 2.

Figures 2, 3, 4, 5, 6, 7, 8, 9, 10, 11:
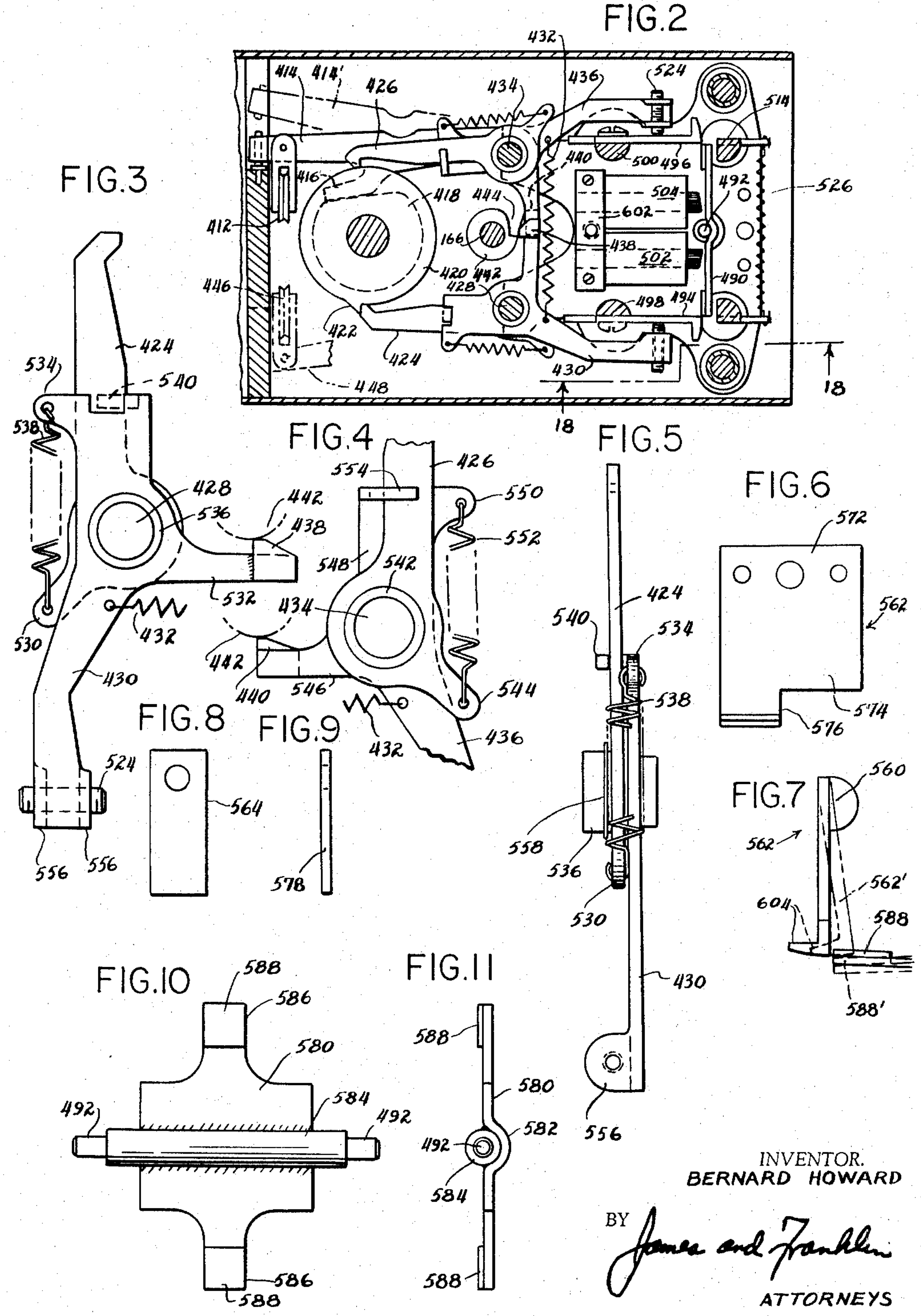
Fig. 2 is a section taken approximately in the plane of the line 2—2 of Fig. 12.
Fig. 3 is an enlarged view of one of the clutch stop levers which operates as a pusher.
Fig. 4 is a fragmentary enlarged view of the middle portion of one of the clutch stop levers which acts as a hook.
Fig. 5 is an edge view of the stop lever shown in Fig. 3.
Fig. 6 shows one part of a latch plate forming a part of the invention.
Fig. 7 is an edge view of the same in its relation to the latch.
Fig. 8 shows another part of the latch plate.
Fig. 9 is an edge view of the latch plate part shown in Fig. 8.
Fig. 10 shows the configuration of the latch.
Fig. 11 is an edge view of the latch shown in Fig. 10.

Referring now to Fig. 2, pulley 412 is carried at the end of cam follower lever 414, the cam follower portion 416 of which bears against a cam 418. The lever is moved between an "in" position shown in solid lines, and an "out" position shown at 414' in broken lines. The half rotation of cam 414 is controlled by a clutch 420 having a stop tooth 422 which engages stops 424 and 426, The clutch action may be a simple frictional drive, or in more refined form, it may utilize improved friction roller clutches, including also anti-chatter back-stops, as disclosed in detail in my copending application Serial No. 637,184, filed January 30, 1957, and entitled "Multiple Clutch." The push stop 424 is pivoted at 428, and forms part of a lever, the extension 430 of which is pulled by a spring 432. The hook stop 426 is pivoted at 434, and forms part of a lever, the extension 436 of which is also pulled by spring 432. The levers are T-shaped and include cam follower portions 438 and 440. These are urged toward a sequence cam 442 mounted on a sequence cam shaft 166 which normally prevents release of the stops until a desired time, indicated by the cam drop 444.

Attention is directed to the pulley 446 shown in phantom lines. This is carried at the end of a pulley lever 448, and it will be understood that the latter if shown more completely, would have a cam follower portion, and would cooperate with a cam, much as in the case of lever 414. The cable extends back and forth between successive pulleys, and the motion of each pulley working on a single cable differs from that of another pulley, one motion being double the next. The net effect is that each cable may be shortened or lengthened in varying amounts, depending on the combinations of pulley movement. This is all explained in detail in my Patent 2,769,029 aforesaid.

The present selector is intended to respond to a five level code, that is, five pulses (exclusive of synchronizing control) are available for selection of each character to be printed. The term "pulse" is used for convenience, although in practice it is customary to have continuous energization of the telegraph line so as to more readily detect a failure or breakage of the line. In any event, during each interval or time period the line current is either "on" or "off," and the term "pulse" refers simply to one of these conditions for one of the time intervals.

Reverting to Fig. 1, the main cam shaft 90 drives a gear 162 meshing with a gear 164 carried by the sequence shaft 166, and thus the latter is continuously driven by the motor M. If the sequence shaft is driven in one-to-one ratio with the cam shaft, the sequence cam corresponding to cam 442 in Fig. 2 will have two diametrically opposite drops, but by driving the sequence shaft in two-to-one ratio (twice as fast as the cam shaft), the sequence cams may have a single drop as shown in Fig. 2.

Although the latch may release all of the stops simultaneously, the response at the clutches and cams is limited to that clutch and cam which is to be controlled by one particular pulse in the series, and this distribution of the pulse response is taken care of by the sequence cams, one of which is shown at 432 in Fig. 2. The sequence cams are angularly displaced from one another, so that the clutches operate in desired sequence.

The present improvement concerns the latch arrangement, whereby the incoming telegraph pulses control the operation of the stop levers, and consequently the clutches, the cams and the pulleys. In my patent, the electrical circuitry energizes magnets which directly control the stop levers. In my copending application, Serial No. 652,179 aforesaid, the magnets control latches which control the stop levers, there being one latch and associated magnets for each clutch. This was an important improvement but the latches were not inherently dynamically balanced; were necessarily tiny in dimension; required precise adjustment; were not adapted to receive tool steel wearing surfaces; and were controlled by magnets of limited physical dimension.

Figure 19:
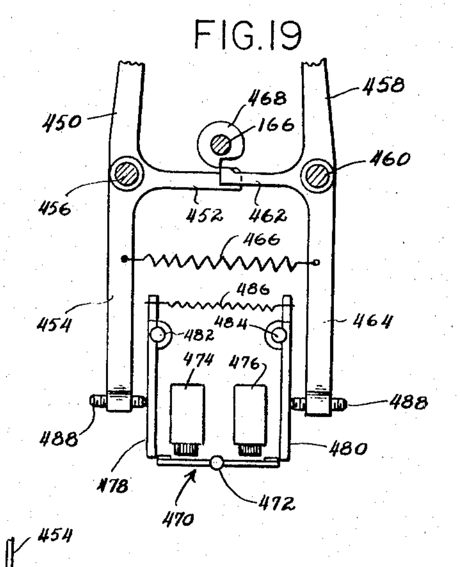
Fig. 19 is a transverse view somewhat akin to Figs. 2 and 17, but showing a simplified form of the invention.

The idea underlying the present improvement is most readily described with reference to Figs. 19 and 20 of the drawing. Referring first to Fig. 19, the push stop lever 450 is T-shaped, and includes a cam follower portion 452 and an extension 454, the pivot being at 456. Similarly, the pull stop lever 458 is T-shaped and pivoted at 460. It has a cam follower portion 462 and an extension 464. The extensions 454 and 464 are pulled toward one another by a pull spring 466, thereby urging the cam followers toward the sequence cam 468, and at the same time urging the stop levers outward to clutch release position. Such movement is prevented by a tiltable latch generally designated 470. This is a symmetrical latch pivoted at 472, and it is normally tilted in one direction or the other. The horizontal position shown is a transition position which is assumed only momentarily as the latch is tilted by energization of either magnet 474 or 476.

Latch 470 operates on latch plates 478 and 480. These are pivoted on axes 482 and 484 extending collaterally of the cam shafts, that is the main cam shaft 90 shown in Fig. 1, and the sequence shaft 166 shown in Figs. 1, 2 and 17. Only the sequence shaft is shown in Fig. 19. The latch plate 478 is disposed just inside the stop lever extensions 454, and the latch plate 480 is disposed inside the stop lever extensions 464. Each latch plate may control a plurality of clutch stop levers, as will be clear from inspection of Fig. 20, in which it will be seen that latch 470 controls a relatively long latch plate 478 pivoted at 482 and cooperating with six stop lever extensions which may be all alike, and one of which is marked 454.

The latch 470 (Fig. 19) is disposed transversely of the latch plates 478, 480 between the movable edges of said latch plates. The magnets 474 and 476 are disposed one on each side of the latch axis 472.

Figure 21:
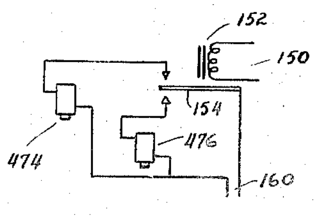
Fig. 21 is a wiring diagram for the simplified modification shown in Figs. 19 and 20.

The circuitry may be quite simple, as will be seen from inspection of Fig. 21, in which the incoming telegraph line (or radio channel output) is connected at 150, and controls a relay coil 152 which operates a relay contact 154. This controls a local source of current supplied at 160. It will be evident that when the relay 154 is closed to the upper contact, it energizes the magnet 474, and when the relay is closed to the lower contact, it energizes the magnet 476. It will also be understood that the relay is always in one position or the other, and consequently one magnet or the other is energized at all times.

Figure 20:
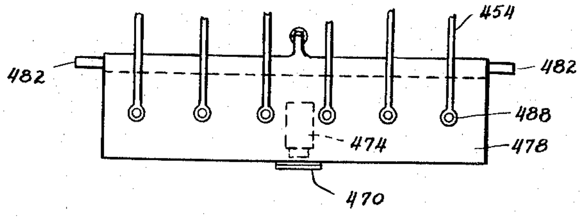
Fig. 20 is a longitudinal view of the simplified mechanism shown in Fig. 19.

Reverting now to Figs. 19 and 20, it will be understood that when magnet 474 is energized, the left side of the latch is up and thereby holds the latch plate 478, which in turn holds the stop lever extensions 454, and at the same time, the right side of the latch is down, thereby releasing the latch plate 480, and thereby releasing the stop lever extensions 464. Conversely, with magnet 476 energized, the latch is in opposite position, thereby holding the latch plate 480 and its stop levers, while releasing the latch plate 478 and its stop levers.

Although all six stop levers on one side or the other are released, the response at the clutches and cams is limited to that clutch and cam which is to be controlled by one particular pulse in the series received for each character to be printed, and this distribution of the pulse response is taken care of by the sequence cams, one of which is shown at 468 in Fig. 19. It will be understood that there are sequence cams for all of the clutches, and that they are rotatably displaced from one another, so that the clutches can operate solely in desired sequence. The rest of the time the stop levers are held in stop position by the generally circular periphery of the sequence cams. The sequence cam releases the stops on both sides of a single clutch, but the latch releases only one or the other.

In passing, it may be mentioned that the radius of the sequence cams is such that the latch 470 is free to move without friction at the latch plates 478 and 480. Specifically, the latch plates are held outward against the stop levers by a spring 486. This spring is light compared to the spring 466, and the latter dominates. At this time, there is a slight clearance between the ends of the latch 470 and the inner face of the latch plates 478 and 480. Thus, the latch 470 is readily tilted to either extreme position.

It is convenient to provide for ready adjustment of the overall relation between the sequence cam, the stop lever and the latch plate, and this is most conveniently afforded by the provision of an adjusting screw 488 at the lower end of each of the stop levers.

Considered in one aspect, the invention comprises a symmetrical or balanced latch disposed transversely between the stop levers and tiltable to control the same, for it will be recognized that the latch plates might be eliminated, with the latch disposed directly between the levers, and controlling the same directly instead of indirectly. Considered in another aspect, the invention includes the introduction of the latch plates between the latch and the levers, thereby facilitating the design of cooperating stop surfaces and edges for long wear, and providing a sensitive yet dependable response. Considered in still another aspect, the invention consists in using only two magnets of relatively large size, requiring relatively small current, to dependably control a single rugged latch which in turn controls a plurality of levers.

In Fig. 19, it will be understood that magnet 476 might be positioned beneath magnet 474, or conversely, magnet 474 might be positioned beneath magnet 476, although such a rearrangement would be less compact and therefore less desirable. Moreover, a single magnet might be used, with a spring biasing the latch away from the magnet. I consider two magnets better for a number of reasons. One is that the use of two magnets automatically compensates for change in local battery voltage. When a spring is used, it may be adjusted for either full voltage on the magnet, or reduced voltage. If adjusted for reduced voltage, the operating speed of the printer must be kept lower than it could be when full voltage is available. If the spring tension is adjusted for full voltage, then in the event of reduced voltage, the magnet will be inadequate to pull the latch against the opposing force of the spring. The two-magnet arrangement avoids this problem. It has another advantage for military purposes, in that an enemy cannot read the signal from the radiation, for it is continuous.

As so far described, all of the stop levers on one side of the cams are controlled by one latch plate, and all on the other side by a second latch plate. However, in the preferred arrangement next described, the control is subdivided, and half of the levers on one side are controlled by an outer latch plate and latch, while the other half are controlled by an inner latch plate and latch. The outer latch plate and latch correspond generally to what is shown in Fig. 19, and these are also shown in Fig. 2, in which latch 490 pivoted at 492 controls latch plates 494 and 496 pivoted at 498 and 500. The tiltable latch 490 is controlled by magnets 502 and 504.

Figure 17:
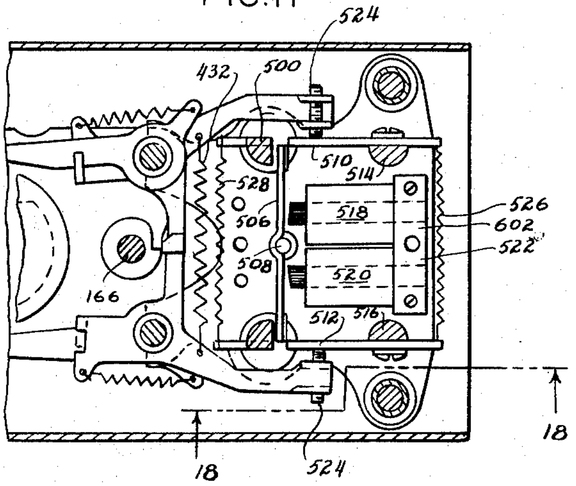
Fig. 17 is a section generally similar to Fig. 2 but showing the inner latch and its operating magnets.

Referring now to Fig. 17, I there show the other latch and latch plates which may be referred to as the inner latch and latch plates. Specifically, the inner latch 506 is pivoted at 508 and controls latch plates 510 and 512 which are pivoted at 514 and 516. Latch 506 is controlled by magnets 518 and 520, which may for convenience be structurally connected by insulation cross members 522. On comparison of Figs. 2 and 17, it will be seen that the arrangements are symmetrical but reversed from right to left. With this arrangement, it is convenient to locate the adjusting screws 524 of the stop levers half way between the axis 514 of latch plate 510 (Fig. 17) and the axis 500 of latch plate 496 (Fig. 2). In such case, the distances travelled by the latch plates are the same for the inner and outer latch plates, and are the same for the top and bottom latch plates. In Fig. 17, the latch plates 510 and 512 are urged outward against their stop levers by a light pull spring 526. Similarly, reverting to Fig. 2, the latch plates 496 and 494 are pulled outwardly against their stop levers by a light pull spring 528. The main spring 432 dominates the light springs. The latch plates are described in detail later.

The stop levers are preferably made of two relatively movable parts, thereby affording safety in the event of malfunction of the machine. More specifically, and referring to Figs. 3 and 5 of the drawing, the push stop 424 is provided with an offset ear 530. The stop lever extension 430 and the cam follower lever 532 are integral, and are provided with an ear 534. They are provided with a hub 536, and the push stop 424 is oscillatably received on the hub 536. The ears 530 and 534 are connected by a pull spring 538. The parts 430, 532 further include a motion limiting stop 540 which bears against the push stop 424, as is best shown in Fig. 5.

On reflection, it will be seen that with this arrangement, the push stop is moved outward to clutch-release position by the main pull spring 432 when jointly released by the latch plate and the sequence cam, but in the event of malfunction of the machine, the push stop 424 may move outward without the parts 530 and 532 by stretching the spring 538.

Generally similar remark applies to the pull stop lever 426, and referring to Fig. 4 of the drawing, it will be seen that stop 426 is pivoted on a hub 542, and provided with an ear 544. The extension 436 and cam follower arm 546 are formed integrally with one another and with a part 548 having an ear 550. The ears 544 and 550 are connected by a pull spring 552. The part 548 is provided with a motion limiting stop 554. With this arrangement, the parts move as a unit under all normal conditions, but in the event of malfunction of the apparatus, the stop 426 may yield outward relative to the parts 436, 546 by stretching the spring 552.

In passing, it may be pointed out that the arms 532 (Fig. 3) and 546 (Fig. 4) may have added thereto special cam follower blocks 438 (Fig. 3) and 440 (Fig. 4) which may be made of hardened tool steel for long wear. The stop 424 (Fig. 5) is held on hub 536 by means of a snap ring 558 which is snapped into a groove formed in the hub.

Referring now to Figs. 3 and 5, the lower end of the stop lever extension 430 has ears which are bent transversely, as shown at 556, and these are threaded to receive an adjusting screw 524. By displacing one ear slightly relative to the other, axially of the screw, the threads may bind the screw 524 so as to make the adjustment self-locking.

The latch plates may be described with reference first to Fig. 15. This shows a pivot shaft or trunnion bar 560. Instead of a continuous plate, this carries small sections of plate located where needed. Specifically, there is a wide portion 562 and two narrow portions 564 and 566. There is also an oppositely projecting ear 568 which receives a light pull spring (either 526 or 528) which urges the latch plate outward against the clutch stop levers. The parts are all received in mating "flats," as will be clear from inspection of the drawing. The shaft 560 is also cut away in a perpendicular direction, as shown at 570, this being merely to provide clearance for the ends of the opposite latch. For example, in Fig. 2, the said flats provide clearance for the ends of the latch 490, while in Fig. 17, the said flats provide clearance for the ends of the latch 506.

The configuration of the wide portion 562 of the latch plate is best shown in Figs. 6 and 7. The apertured end 572 is secured to the pivot shaft or trunnion bar of the latch plate. The area at 574 acts against one of the stop levers. The extended part 576 is what cooperates with the latch.

The narrow parts of the latch plate may take the configuration shown in Figs. 8 and 9. The apertured end is what is secured to the pivot or trunnion bar, while the opposite end cooperates with one of the stop levers.

The latch may be described with reference to Figs. 10 and 11 of the drawing. Both latches are alike. In each case, the latch consists of heavy gauge ferrous sheet metal 580 which is channeled at 582 (Fig. 11) to receive a pivot pin 584, the ends of which may be reduced in diameter to form trunnions 492. The latch is quite wide in axial direction in order to receive on either side of the bar the spaced poles of a relatively large U magnet, but the latch is narrowed at the ends 586 where it cooperates with the latch plates. These ends may be armed with pieces of hardened tool steel 588.

Figures 13, 14, 15, 16:
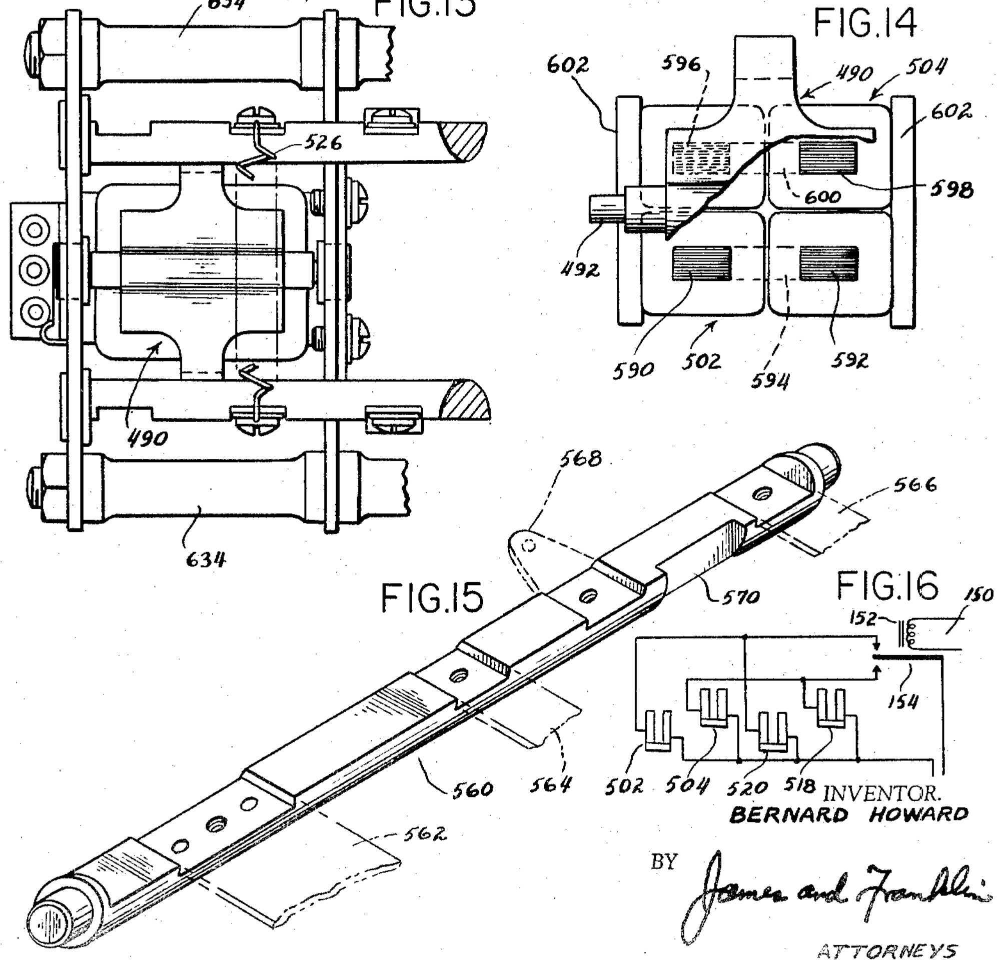
Fig. 13 is a vertical elevation of a part of the latch plate assembly shown in Fig. 12.
Fig. 14 is a fragmentary view showing the relation of the latch to the magnets which operate the latch.
Fig. 15 is a perspective view showing the pivot portion of the latch plate.
Fig. 16 is a wiring diagram for the selector.

Referring now to Fig. 14, the latch 490 is shown only fragmentarily, but sufficient to show its relation to the magnets. One of the trunnions is shown at 492, while the other is omitted. The latch acts as an armature which may be acted on by either U-shaped magnet 502 or U-shaped magnet 504. Magnet 502 has poles 590 and 592 connected as indicated at 594, and the legs of the U are surrounded by coils which are simultaneously energized. The similar magnet 504 has poles 596 and 598 connected at 600 and magnetized by coils on each of the legs. Each of the U-shaped cores is built up of laminations as indicated in Fig. 14. For structural convenience, the parts 594 and 600 of the magnets may be clamped together, as by use of non-ferrous or plastic bridging pieces 602. These are shown in Figs. 2 and 17, but must not be mistaken for parts of the cores, which instead run in a direction perpendicular to the bridging pieces 602. In Figs. 2 and 17, it will be noted that the ends of the poles of the magnet are disposed somewhat at an angle to accommodate the tilt of the latch. This angle has been exaggerated in the drawing, and in practice may be less than two degrees. Also the air gap has been exaggerated.

Reverting now to Fig. 7, the hardened piece 588 of the latch bears against the inner face of the latch plate at its lower edge and prevents inward movement of the same. When, however, the latch is tilted down to the broken line position 588′, the latch plate 562 may move inward to its broken line position 562′, the amount of movement being determined by the motion of the clutch stop lever bearing against the latch plate. It will be noted that the lower edge of the latch plate is provided with an outwardly turned projection or tail 604. The bottom face of this is curved on a radius centered on the axis of movement at 560. This is a precaution in that the latch plate will itself serve to hold the latch in tilted position until the latch plate has been permitted to move outward by restoration of the clutch stop lever to its stop position.

Figure 18:
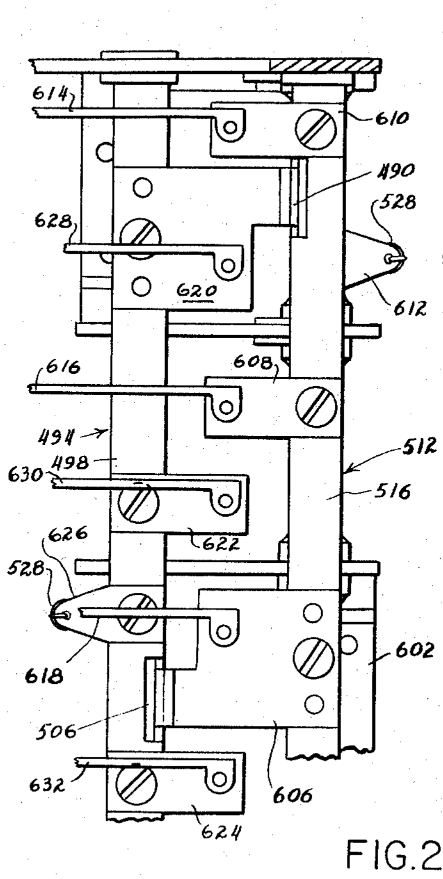
Fig. 18 is a bottom plan view taken approximately in the plane of the line 18—18 of Fig. 2.

It has already been mentioned that two latches may be used to control four latch plates which control (in this case) the twelve clutch stop levers. For symmetry and compactness, I employ inner and outer latch plates which are disposed in common planes, and which are so shaped as not to interfere with one another. The way this is done will be clear from examination of Fig. 18, in which an inner latch 506 controls an inner latch plate generally designated 512, and comprising a pivot bar 516 carrying a wide plate portion 606, narrow plate portions 608 and 610, and an ear 612 for pull spring 528. This latch plate controls three clutch stop levers, the ends of which are indicated at 614, 616 and 618. At the same time, an outer latch 490 controls an outer latch plate generally designated 494, the said latch plate being made of a pivot bar 498 carrying a wide portion 620, two narrow portions 622, 624, and an ear 626 for pull spring 528. This inner latch plate controls clutch stop levers indicated at 628, 630 and 632. Thus, in the present case, alternate levers are controlled by one latch plate, while the intermediate levers are controlled by the other latch plate.

Figure 12:
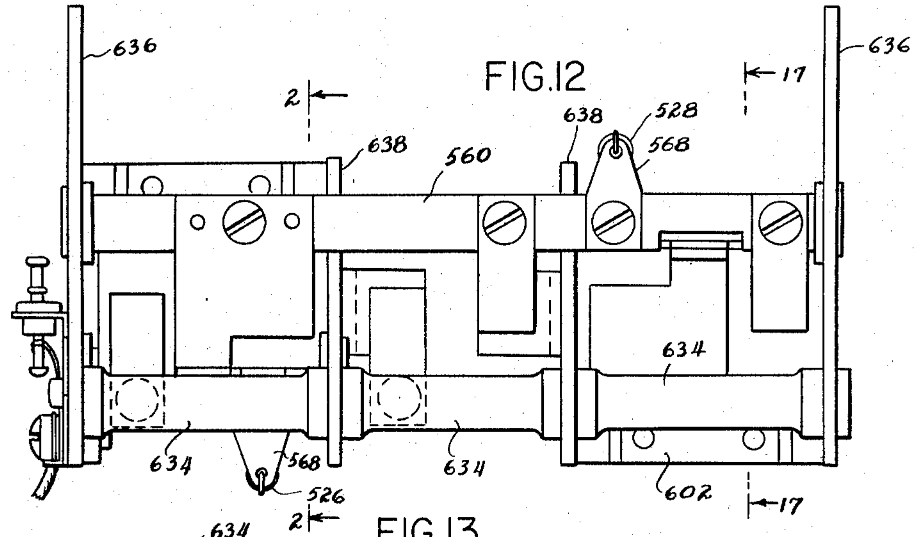
Fig. 12 is a plan view of the latch and latch plate assembly.

Moreover, the disposition and spacing of the latch plate parts are such that the parts of plate assembly 494 come between the parts of plate assembly 512, and thus these assemblies do not interfere with one another. This staggered relation of the parts of the latch plates is also shown in Fig. 12 of the drawing, but in that figure, the outer pivot bar is concealed by the spacers 634 of the frame assembly the frame consisting of end plates 636 with smaller intermediate plates 638 connected by through bolts passing through spacers 634. The end plates 636 provide the bearings for the trunnions or pivot bars of the four latch plates. The end plates together with the intermediate plates 638 provide bearings for the latches, and in addition, provide means for mounting the magnets in position.

One advantage of this assembly is that it may be inserted bodily between or removed bodily from the space between the stop lever extensions. This greatly facilitates servicing of the mechanism.

The wiring diagram for the selector shown in Figs. 3–18 is given in Fig. 16, in which, as before, the signal is received on line 150 and controls a relay coil 152 which controls a movable contact 154. When the relay is closed to its upper contact, the magnets 502 and 520 are energized, and when the relay is closed to its lower contact, the magnets 504 and 518 are energized. In any case, the magnets move the latches in a direction to lock or release both latch plates on one side, or on the other, so that all of the push stops, or all of the pull stops, are simultaneously released.

In the drawings, the movable contact 154 of the relay is shown in mid position, but in practice it never remains there. It closes to one contact or the other at all times. Similarly, the latch is shown in mid position, but in practice it never remains in mid position.

In mid position the latch preferably overlaps both latch plates slightly, that is, it preferably is in a position to stop both. This guards against possible simultaneous release of both stops of a single clutch. Similar remark applies to the latch of Fig. 19.

It is believed that the method of making and using my improved selector mechanism, as well as the advantages thereof, will be apparent from the foregoing detailed description. All of the clutches may be controlled by one or two latches, instead of requiring one latch for each clutch. This makes it possible to use large magnets to exert a strong force while requiring only low current. There is adequate room for large coils and for a magnet core of efficient U-shape. The latch may be a symmetrical or balanced latch, and it acts as an armature for the magnets. The travel at the end of the latch is greater than at the magnet, and thus the air gap may be kept quite small. The arrangement is sturdy, and makes it possible to use hardened stop surfaces which provide long wear. Adjustment is easy because there is only one adjusting screw for each stop lever, and it is located in a readily accessible position. Servicing is easy because the latch mechanism forms a subassembly which may be bodily inserted between or removed from the stop levers.

It will be apparent that while I have shown and described my invention in several preferred forms, changes may be made in the structure shown without departing from the scope of the invention as sought to be defined in the following claims.

I claim:

1. In a telegraph printer, a shaft having a clutch driving a cam, first and second stop levers on opposite sides of the clutch to arrest movement of the cam at half revolution intervals, said stop levers having extensions beyond their pivots, resilient means urging said stop levers toward release position and thereby urging the extensions toward one another, a latch disposed in a plane generally transverse to the extensions and pivoted for tilt about an axis extending collaterally of the cam shaft, magnets disposed on opposite sides of the latch axis, and circuitry to energize one magnet or the other to tilt the latch between a first position which blocks one stop lever against movement while releasing the other, and a second position in which the latch blocks the second stop lever against movement while releasing the first.

2. In a telegraph printer, a shaft having a clutch driving a cam, first and second stop levers on opposite sides of the clutch to arrest movement of the cam at half revolution intervals, a sequence cam to prevent release of said stops until a desired time, said stop levers having extensions beyond their pivots, resilient means urging said stop levers toward said sequence cam in an effort to release said stops and thereby urging the extensions toward one another, a latch disposed in a plane generally transverse to the extensions and pivoted for tilt about an axis extending collaterally of the cam shaft, magnets disposed on opposite sides of the latch axis, and circuitry to energize one magnet or the other to tilt the latch between a first position which blocks one stop lever against movement while releasing the other, and a second position in which the latch blocks the second stop lever against movement while releasing the first.

3. The combination defined in claim 2, in which the latch is so dimensioned that in mid position it blocks both stops in order to prevent possible simultaneous release of both stops.

4. The combination defined in claim 2 in which each stop lever is pivotally connected to its extension and is provided with resilient means affording outward movement of one part relative to the other in the event of malfunction of the mechanism.

5. In a telegraph printer, a shaft having a clutch driving a cam, first and second stop levers on opposite sides of the clutch to arrest movement of the cam at half revolution intervals, a sequence cam to prevent release of said stops until a desired time, said stop levers having extensions beyond their pivots, resilient means urging said stop levers toward said sequence cam in an effort to release said stops and thereby urging the extensions toward one another, a latch disposed in a plane generally transverse to the extensions and pivoted symmetrically for a slight tilt about an axis extending collaterally of the cam shaft, two U-shaped magnets symmetrically disposed between said extensions on opposite sides of the latch axis, and circuitry to energize one magnet or the other to tilt the latch between a first position which blocks one stop lever against movement while releasing the other, and a second position in which the latch blocks the second stop lever against movement while releasing the first.

6. In a telegraph printer, a main shaft having a series of clutches each driving a main cam, stop levers one for each clutch to arrest movement of its cam at desired intervals, a sequence cam shaft carrying a plurality of sequence cams one for each clutch, said stop levers cooperating with said sequence cams to prevent release of the stop levers until a desired time for each stop lever, resilient means urging said stop levers toward release position, a latch plate disposed alongside a plurality of stop levers, said latch plate being pivoted on an axis extending generally parallel to the cam shaft, a latch disposed transversely of the latch plate, said latch being pivoted on an axis generally parallel to the cam shaft, a pair of magnets one on each side of the latch axis near the latch, and circuitry for energizing one magnet or the other to control the position of the latch, said latch in one position holding the latch plate and thereby holding the stop levers, and said latch in its other position releasing the latch plate and thereby releasing the stop levers.

7. In a telegraph printer, a shaft having a series of clutches each driving a cam, first and second stop levers on opposite sides of each clutch to arrest movement of its cam at half revolution intervals, said stop levers having extensions beyond their pivots, resilient means urging the stop levers toward release position and thereby urging the extensions toward one another, a latch plate disposed inside a plurality of stop lever extensions at one side, another latch plate disposed inside a plurality of stop lever extensions at the other side, said latch plates being pivoted on axes extending collaterally of the cam shaft, a latch disposed transversely of the latch plates between the movable edges of the latch plates, said latch being pivoted on an axis collateral of the cam shaft, a pair of magnets one on each side of the latch axis near the latch, and circuitry for energizing one magnet or the other to control the position of the latch, said latch in one position holding one latch plate and thereby holding the stop levers having extensions bearing against said latch plate, and releasing the second latch plate and thereby releasing the stop levers having extensions bearing against said second latch plate, and said latch in its other position holding the second latch plate and releasing the first latch plate.

8. In a telegraph printer, a main shaft having a series of clutches each driving a main cam, first and second stop levers on opposite sides of each clutch to arrest movement of its cam at half revolution intervals, a sequence cam shaft carrying a plurality of sequence cams one for each clutch, said stop levers cooperating with said sequence cams to prevent release of the stop levers until a desired time for each stop lever, said stop levers having extensions beyond their pivots, resilient means urging said stop levers toward release position and thereby urging the extensions toward one another, a latch plate disposed inside a plurality of stop lever extensions at one side, another latch plate disposed inside a plurality of stop lever extensions at the other side, said latch plates being pivoted on axes extending collaterally of the cam shaft, a latch disposed transversely of the latch plates between the movable edges of the latch plates, said latch being pivoted on an axis collateral of the cam shaft, a pair of magnets one on each side of the latch axis near the latch, and circuitry for energizing one magnet or the other to control the position of the latch, said latch in one position holding one latch plate and thereby holding the stop levers having extensions bearing against said latch plate, and releasing the second latch plate and thereby releasing the stop levers having extensions bearing against said second latch plate, and said latch in its other position holding the second latch plate and releasing the first latch plate.

9. The combination defined in claim 8 in which an inner latch controls inner latch plates against which some of the stop lever extensions bear, and an outer latch controls outer latch plates against which the remaining stop lever extensions bear, and in which the inner latch plates are pivoted at their outer edges, and the outer latch plates are pivoted at their inner edges, and in which the inner and outer latch plates are so shaped as to clear one another without interference, and in which there are magnets for the inner latch and for the outer latch.

10. The combination defined in claim 8 in which an inner latch controls inner latch plates against which alternate stop lever extensions bear, and an outer latch controls outer latch plates against which the intermediate stop lever extensions bear, and in which the inner latch plates are pivoted at their outer edges, and the outer latch plates are pivoted at their inner edges, and in which the inner and outer latch plates are so shaped as to clear one another without interference, and in which the magnets for the inner latch face in opposite direction from the magnets for the outer latch and are offset from one another longitudinally of the cam shaft, so that both sets of magnets may be and are disposed compactly between the latch plates.

11. The combination defined in claim 8, in which the latch is so dimensioned that in mid position it blocks both latch plates.

12. The combination defined in claim 8, in which each latch plate at the latch has an outwardly directed tail which maintains constant radius relative to the latch when the latch plate moves inward.

13. The combination defined in claim 8, in which the latch is so dimensioned that in mid position it blocks both latch plates, and in which each latch plate at the latch has an outwardly directed tail which maintains constant radius relative to the latch when the latch plate moves inward.

14. The combination defined in claim 8, in which each stop lever extension is provided with an adjusting screw bearing against its controlling latch plate for adjustment of one relative to the other.

15. In a telegraph printer, a main shaft having a series of clutches each driving a main cam, first and second stop levers on opposite sides of each clutch to arrest movement of its cam at half revolution intervals, a sequence cam shaft carrying a plurality of sequence cams one for each clutch, said stop levers cooperating with said sequence cams to prevent release of the stop levers until a desired time, said sequence cams being displaced rotationally to distribute the action of the clutches and cams to correspond to incoming pulses making up the signal, said stop levers having extensions beyond their pivots, resilient means urging said stop levers toward release position and thereby urging the extensions toward one another, a latch plate disposed inside a plurality of stop lever extensions at one side, another latch plate symmetrically disposed inside a plurality of stop lever extensions at the other side, said latch plates being generally parallel and pivoted on axes extending generally parallel to the cam shaft, a latch disposed transversely of the latch plates between the movable edges of the latch plates, said latch being symmetrically pivoted on an axis generally parallel to the cam shaft, the space between said latch plates being occupied by a pair of relatively large U-shaped magnets symmetrically disposed one on each side of the latch axis with their poles close to the latch, and circuitry for energizing one magnet or the other to control the position of the latch, said latch in one position holding one latch plate and thereby holding the stop levers having extensions bearing against said latch plate, and releasing the second latch plate and thereby releasing the stop levers having extensions bearing against said second latch plate, and said latch in its other position holding the second latch plate and releasing the first latch plate.

16. The combination defined in claim 15, in which the latch is so dimensioned that in mid position it blocks both latch plates.

17. The combination defined in claim 15, in which each latch plate at the latch has an outwardly directed tail which maintains constant radius relative to the latch when the latch plate moves inward.

18. The combination defined in claim 15, in which the latch is so dimensioned that in mid position it blocks both latch plates, and in which each latch plate at the latch has an outwardly directed tail which maintains constant radius relative to the latch when the latch plate moves inward.

19. The combination defined in claim 15, in which each stop lever extension is provided with an adjusting screw bearing against its controlling latch plate for adjustment of one relative to the other.

20. In a telegraph printer, a shaft having a clutch driving a cam, first and second stop levers on opposite sides of the clutch to arrest movement of the cam at half revolution intervals, said stop levers having extensions beyond their pivots, resilient means urging the stop levers toward release position, and thereby urging the extensions toward one another, a latch plate disposed inside one extension, another latch plate disposed inside the other extension, said latch plates being pivoted on axes extending collaterally of the cam shaft, a latch disposed transversely of the latch plates between the movable edges of the latch plates, said latch being pivoted on an axis collateral of the cam shaft, magnet means and associated circuitry for controlling the position of the latch, said latch in one position holding one latch plate and its stop lever and releasing the second latch plate and its stop lever, and said latch in its other position holding the second latch plate and releasing the first latch plate.

21. In a telegraph printer, a shaft having a clutch driving a cam, first and second stop levers on opposite sides of the clutch to arrest movement of the cam at half revolution intervals, a sequence cam to prevent release of said stops until a desired time, said stop levers having extensions beyond their pivots, resilient means urging said stop levers toward said sequence cam in an effort to release said stops and thereby urging the extensions toward one another, a latch disposed in a plane generally transverse to the extensions and pivoted for tilt about an axis extending collaterally of the cam shaft, magnet means and associated circuitry to control the position of the latch between a first position which blocks one stop lever against movement while releasing the other, and a second position in which the latch blocks the second stop lever against movement while releasing the first.

22. In a telegraph printer, a main shaft having a series of clutches each driving a main cam, first and second stop levers on opposite sides of each clutch to arrest movement of its cam at half revolution intervals, a sequence cam shaft carrying a plurality of sequence cams one for each clutch, said stop levers cooperating with said sequence cams to prevent release of the stop levers until a desired time for each stop lever, said stop levers having extensions beyond their pivots, resilient means urging said stop levers toward release position and thereby urging the extensions toward one another, a latch plate disposed inside a plurality of stop lever extensions at one side, another latch plate disposed inside a plurality of stop lever extensions at the other side, said latch plates being pivoted on axes extending collaterally of the cam shaft, a latch disposed transversely of the latch plates between the movable edges of the latch plates, said latch being pivoted on an axis collateral of the cam shaft, magnet means and associated circuitry for controlling the position of the latch, said latch in one position holding one latch plate and thereby holding the stop levers having extensions bearing against said latch plate, and releasing the second latch plate and thereby releasing the stop levers having extensions bearing against said second latch plate, and said latch in its other position holding the second latch plate and releasing the first latch plate.

No references cited.